US008240899B2

(12) United States Patent
Huang

(10) Patent No.: US 8,240,899 B2
(45) Date of Patent: Aug. 14, 2012

(54) CONTROLLING DEVICE FOR A HEADLAMP'S HIGH AND LOW BEAM

(76) Inventor: Ching-Yun Huang, Yongkang (TW)

( * ) Notice: Subject to any disclaimer, the term of this patent is extended or adjusted under 35 U.S.C. 154(b) by 348 days.

(21) Appl. No.: 12/758,794

(22) Filed: Apr. 12, 2010

(65) Prior Publication Data

US 2011/0249463 A1 Oct. 13, 2011

(51) Int. Cl.
*B60Q 1/076* (2006.01)

(52) U.S. Cl. ........................................ 362/526; 362/539

(58) Field of Classification Search .................. 362/539, 362/562

See application file for complete search history.

(56) References Cited

U.S. PATENT DOCUMENTS 5,339,226 A * 8/1994 Ishikawa ........................ 362/539
5,899,559 A * 5/1999 Lachmayer et al. .......... 362/539
7,914,190 B2 * 3/2011 Kim et al. ..................... 362/539

* cited by examiner

*Primary Examiner* — David V Bruce

(57) ABSTRACT

A controlling device for a headlamp's high and low beam includes a fixing plate, a valve seat and a light-obstructing plate. The fixing plate is formed with a notch, and the valve seat is secured at one side of the fixing plate and installed therein with an electromagnetic valve having a valve rod positioned inside. The valve rod is fitted around with a spring, having its upper side mounted with a connecting plate with a slide groove. The light-obstructing plate, which has its lower central portion and lower two ends respectively disposed with two pivotal members. The two pivotal members respectively have a pivotal hole, pivotally assembled with the pivotal plate of the valve seat and the connecting plate of the valve rod by rivets. Thus, the light-obstructing plate can be actuated by the valve rod to shift for controlling a light projecting range of a headlamp.

2 Claims, 9 Drawing Sheets

CONTROLLING DEVICE FOR A HEADLAMP'S HIGH AND LOW BEAM

BACKGROUND OF THE INVENTION

1. Field of the Invention

This invention relates to a controlling device for a headlamp's high and low beam, particularly to one provided with an electromagnetic valve having its valve rod driving a light-obstructing plate to turn and shift for controlling a light projecting range of a headlamp and carrying out change-over of high and low beam of the headlamp.

2. Description of the Prior Art

An automobile is generally provided with a change-over device for controlling high and low beam of a headlamp by turning a whole headlamp holder to different angles. However, the conventional way to turning the whole headlamp holder to adjust a headlamp's high and low beam may damage electric wires and shorten the service life of the headlamp. In view of the situation, a device provided with an electromagnetic valve to drive a light-obstructing plate for controlling a headlamp's high and low beam is devised. This conventional control device 1, as shown in FIGS. 1-4, is assembled between the lamp holder 10 of a lamp 100 and a transparent lamp shade 101, composed of a fixing plate 11, a valve seat 12, a light-obstructing plate 13, an elastic retainer 14, a pull plate 15 and a backing plate 16. The fixing plate 11 to be transversely fixed on the lamp holder 10 is disposed with a notch 110 at a location corresponding with the lamp 100 and formed thereon with two opposite protruding pivotal seats 111 and bored with a plurality of combining holes 112. The valve seat 12 to be threadably assembled at one side wall of the fixing plate 11 is installed in the interior with an electromagnetic valve 120 with a valve rod 121 having its upper end cut with an annular groove 122 with a spring 123 fitted around it. The light-obstructing plate 13 is pivotally assembled at one side of the fixing plate 11 and positioned on the valve seat 12, having its opposite ends respectively formed with a pivotal projection 130 bored with an upper pivotal hole 131 and a lower pivotal hole 132. The elastic retainer 14 has two ends respectively inserted in the two opposite lower pivotal holes 132 of the pivotal projection 130 and closely rests against the wall surface of the fixing plate 11. The pull plate 15 has two ends respectively inserted in the opposite two upper pivotal holes 131 of the light-obstructing plate 13, disposed with a fitting groove 150 to be engaged with the annular groove 122 of the valve rod 121 of the electromagnetic valve 120 to let the pull plate 15 press the upper end of the spring 123. The backing plate 16 is threadably mounted at another side of the fixing plate 11 and bored with insert holes 160 respectively corresponding with the combining holes 112 of the fixing plate 11. Thus, when actuated to extend and contract, the valve rod 121 of the electromagnetic valve 120 will drive the pull plate 15 to shift downward and actuate the light-obstructing plate 13 to move bias for controlling the size of a light projecting area and carrying out change-over of a headlamp's high and low beam. Nevertheless, the conventional control device of a headlamp's high and low beam is provided with numerous members, requiring a lot of time and trouble in assembly and increasing manufacturing cost.

At present, using an electromagnetic valve to drive a light-obstructing plate to change its position for regulating a light projecting area is a design tendency of controlling a headlamp's high and low beam.

Based on this conception, the inventor of this invention devised a new device for controlling a headlamp's high and low beam, able to improve the drawback of the conventional device, simplify members, elevate assembly efficiency and lower cost.

SUMMARY OF THE INVENTION

This invention is devised to offer a controlling device for a headlamp's high and low beam, simple in members, quick in assembly and able to lower cost and elevate economic gain.

The controlling device for a headlamp's high and low beam in the present invention includes a fixing plate, a valve seat and a light-obstructing plate combined together.

The fixing plate has its opposite two ends respectively formed with a positioning member with a positioning hole and its upper edge cut with a notch.

The valve seat to be secured at one side of the fixing plate is installed with an electromagnetic valve in the interior and has its topside bored with a through hole communicating with the center of the electromagnetic valve. A valve rod is inserted through the through hole of the valve seat and positioned in the center of the electromagnetic valve, and a spring is fitted around the valve rod. The light-obstructing plate is to cover the notch of the fixing plate.

The feature of this invention is that the valve seat has two opposite sides of its topside respectively and oppositely provided with a pivotal member bent upward and bored with a pivotal hole, and the valve rod has its upper side fixed with a connecting plate with a slide groove. The light-obstructing plate is pivotally combined with both the pivotal plate of the valve seat and the connecting plate of the valve rod and has its lower central portion disposed with two pivotal projections respectively having a pivotal hole, with a rivet inserted in the pivotal hole of the two pivotal projections and the slide groove of the connecting plate of the valve rod. The light-obstructing plate further has its lower opposite two ends respectively fixed with a pivotal member with a pivotal hole, and another rivet is inserted in both the pivotal hole of the two pivotal members and the opposite pivotal holes of a bent-up pivotal member of the valve seat.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
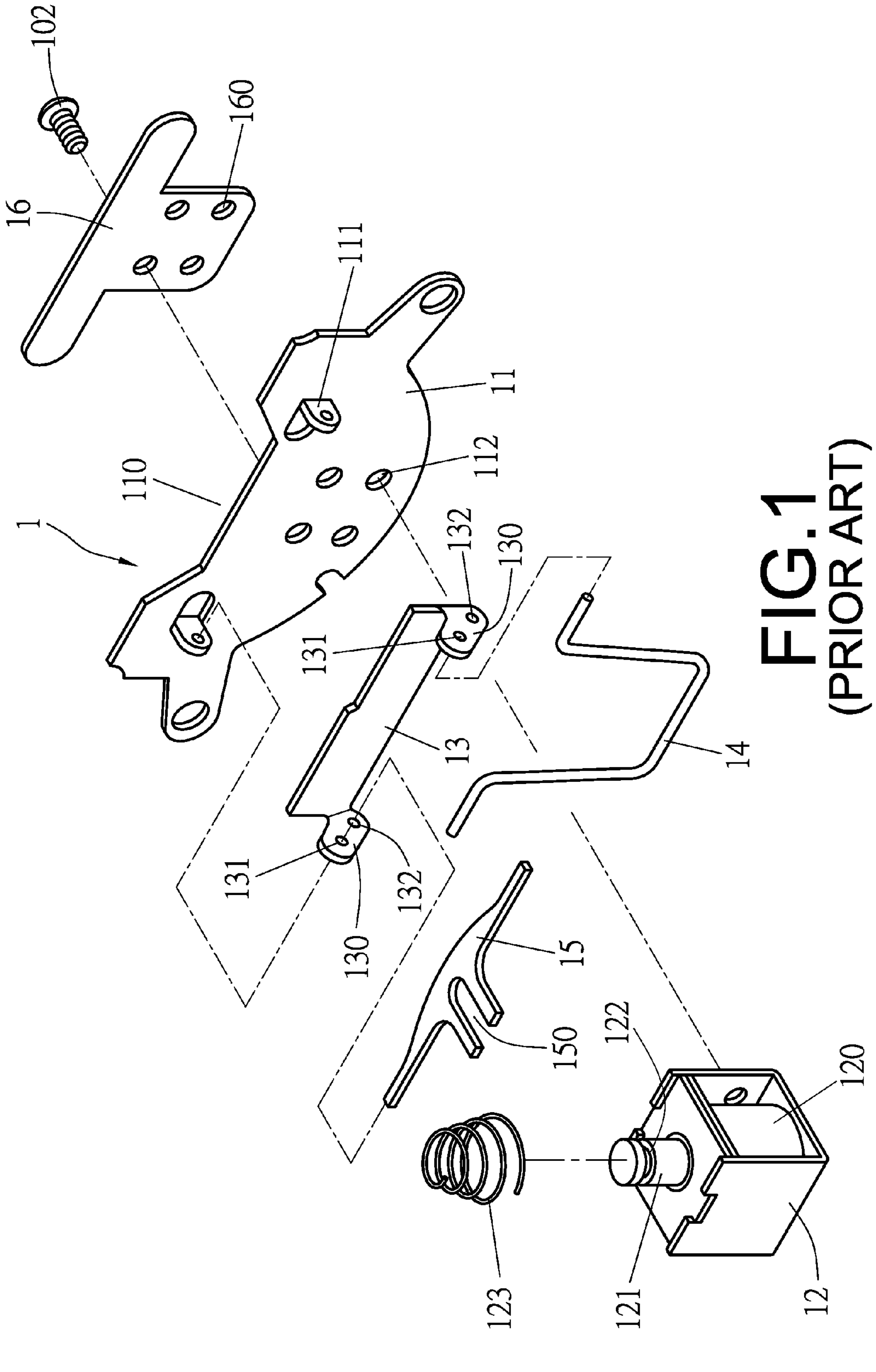
FIG.1 (PRIOR ART)
FIG. 1 is an exploded perspective view of a conventional control device of a headlamp's high and low beam.
Figure 2:
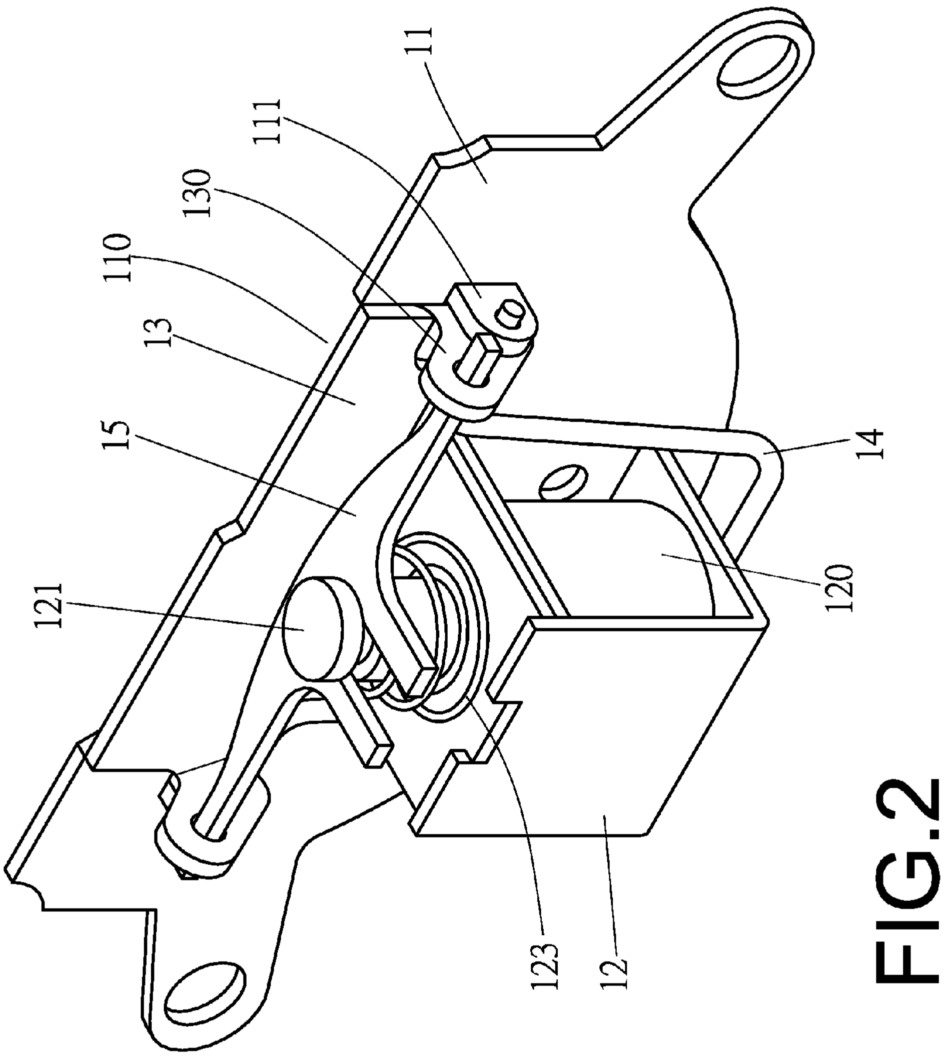
FIG.2 (PRIOR ART)
FIG. 2 is a perspective view of the conventional control device of a headlamp's high and low beam.
Figure 3:
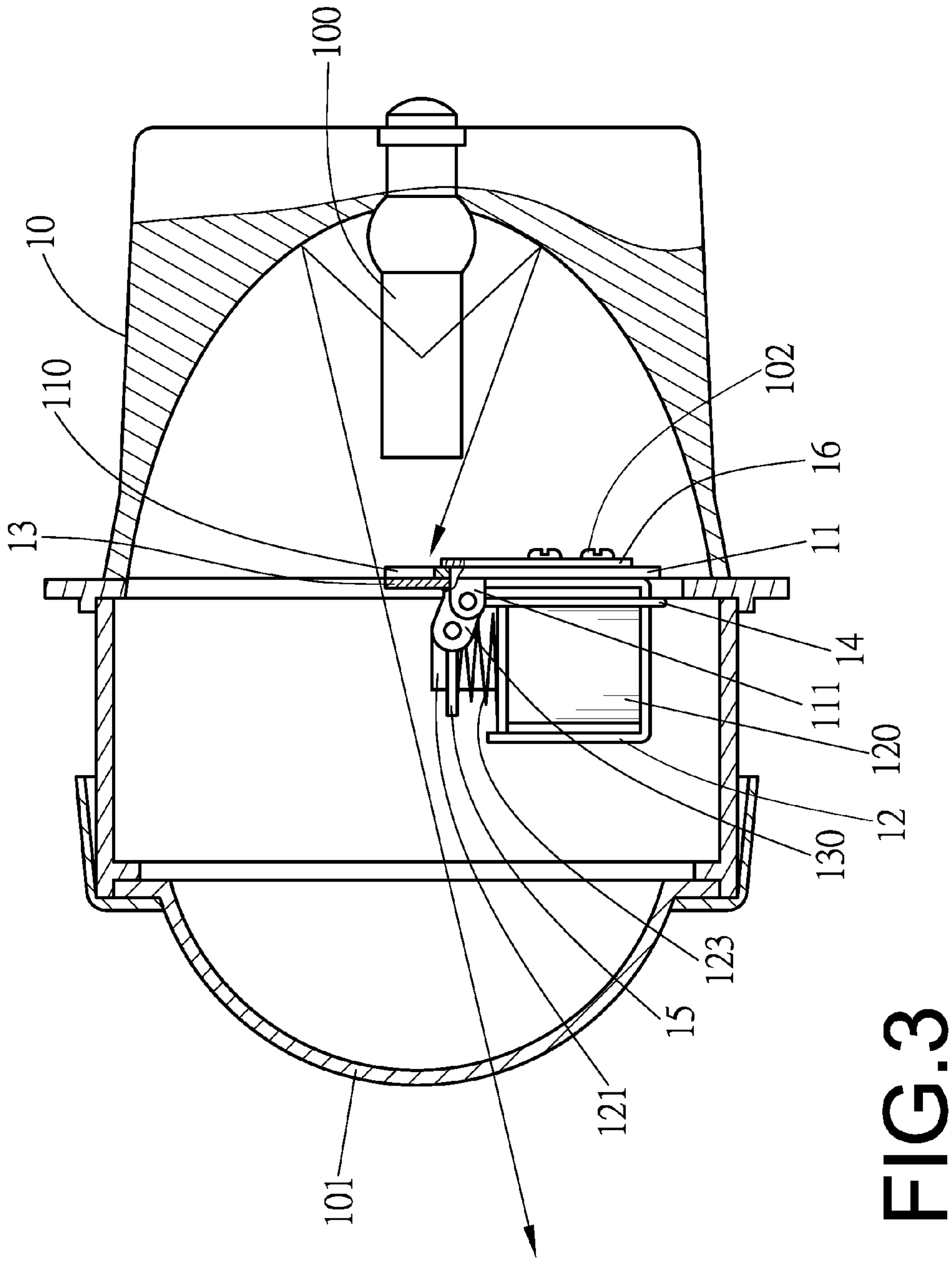
FIG.3 (PRIOR ART)
FIG. 3 is a cross-sectional view of the conventional control device having a headlamp changed into a low beam condition.
Figure 4:
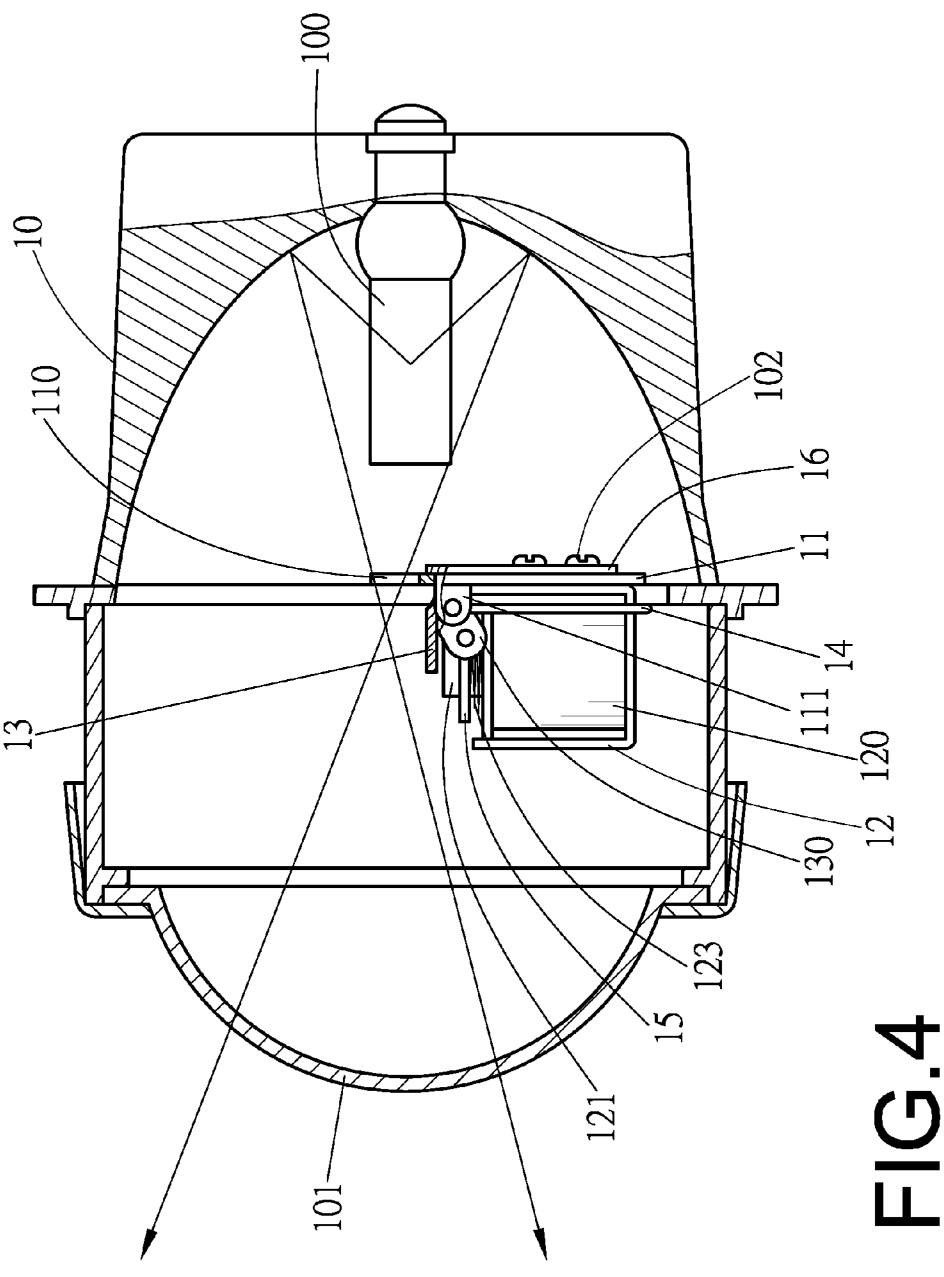
FIG.4 (PRIOR ART)
FIG. 4 is a cross-sectional view of the conventional device having the headlamp changed into a high beam condition.
Figure 5:
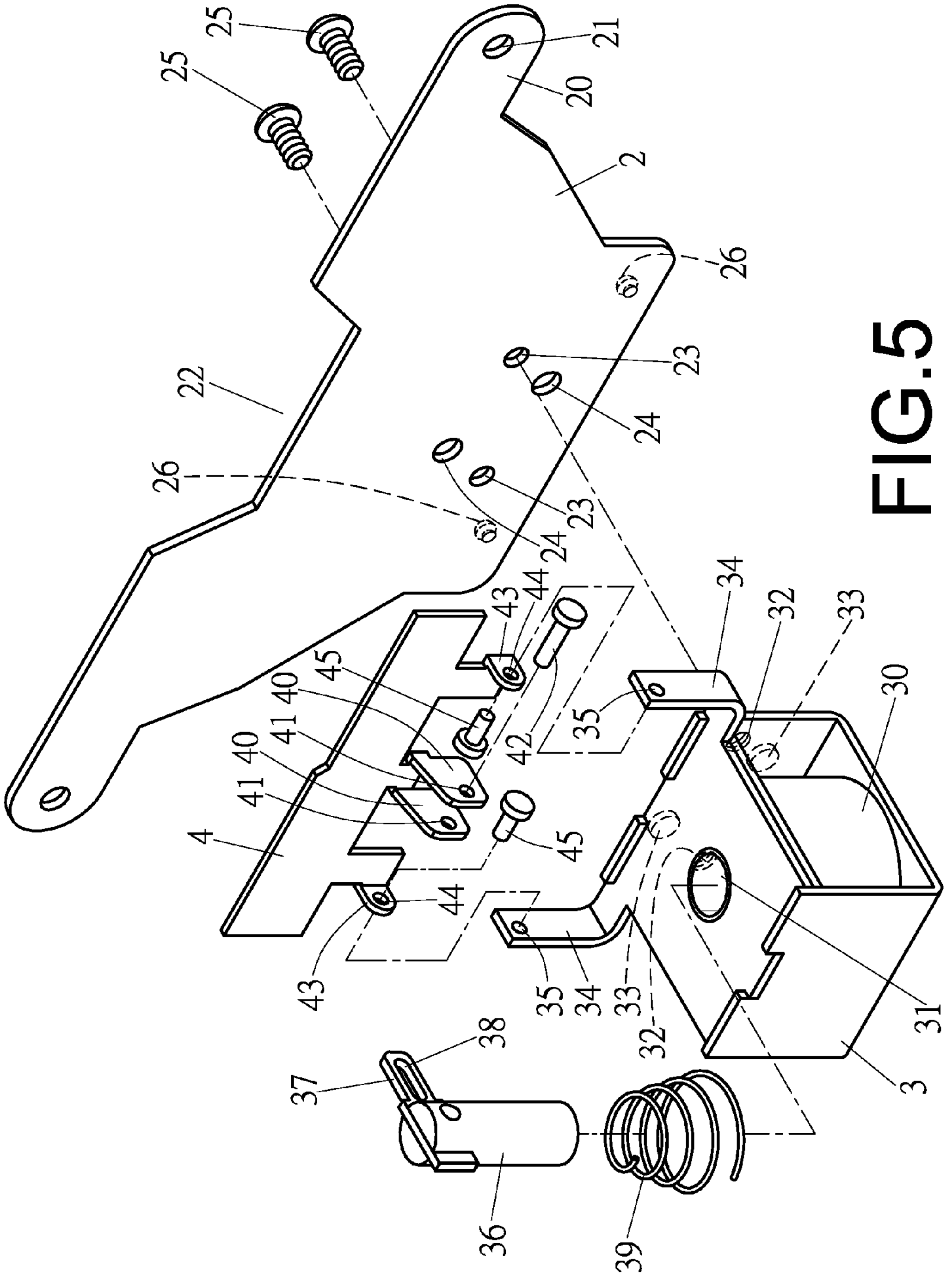
FIG. 5 is an exploded perspective view of a controlling device for a headlamp's high and low beam in the present invention.

A preferred embodiment of a device for controlling a headlamp's high and low beam in the present invention, as shown in FIG. 5, includes a fixing plate 2, a valve seat 3, and a light-obstructing plate 3 as main components combined together.

The fixing plate 2 has its opposite two ends respectively formed with a positioning member 20 with a positioning hole 21, its upper edge cut with a notch 22 and its lower edge provided with two positioning projections 26. The fixing plate 2 is further bored with a plurality of insert holes 23 and positioning engage holes 24 in a lower portion, with a screw member 25 inserted in each insert hole 23.

The valve seat 3 to be secured at one side of the fixing plate 2 is installed in the interior with an electromagnetic valve 30, having its topside bored with a through hole 31 communicating with the center of the electromagnetic valve 30 and one side wall bored with threaded holes 32 at locations corresponding with the insert holes 23 of the fixing plate 2 and provided thereon with positioning projecting members 33 at locations corresponding with the positioning engage holes 24 of the fixing plate 2. Further, the valve seat 3 has its upper opposite sides respectively disposed with a pivotal plate 34 bent upward and bored with a pivotal hole 35. A valve rod 36 is inserted through the through hole 31 of the valve seat 3 and positioned in the center of the electromagnetic valve 30, having its topside fixed with a connecting plate 37 with a slide groove 38, and a spring 39 is fitted around the valve rod 36.

The light-obstructing plate 4 is pivotally combined with both the pivotal plates 34 of the valve seat 3 and the connecting plate 37 of the valve rod 36 for covering the notch 22 of the fixing plate 2. The light-obstructing plate 4 has its lower central portion oppositely provided with two protruding pivotal plates 40 respectively having a pivotal hole 41, with a pivot 42 inserted in the two pivotal holes 41, and its lower two opposite ends respectively set with a pivotal member 43 with a pivotal hole 44 having a pivot 45 inserted therein.

Figure 6:
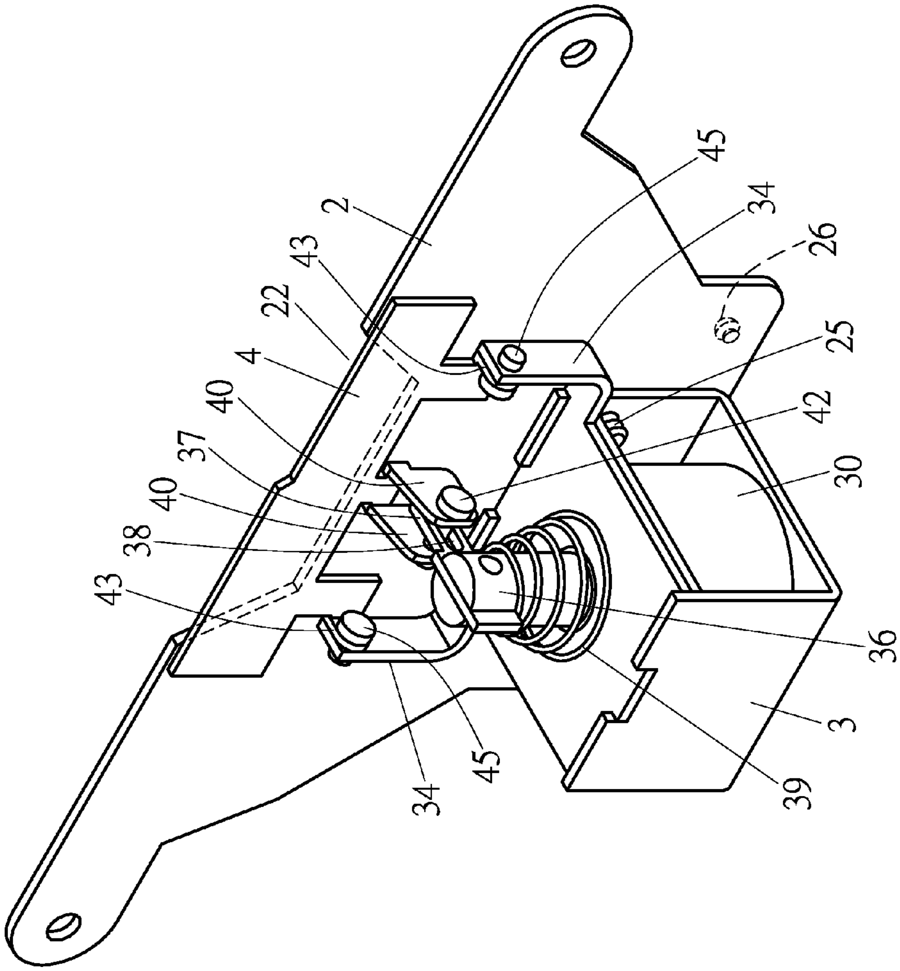
FIG. 6 is a perspective view of the controlling device for a headlamp's high and low beam in the present invention.
Figure 7:
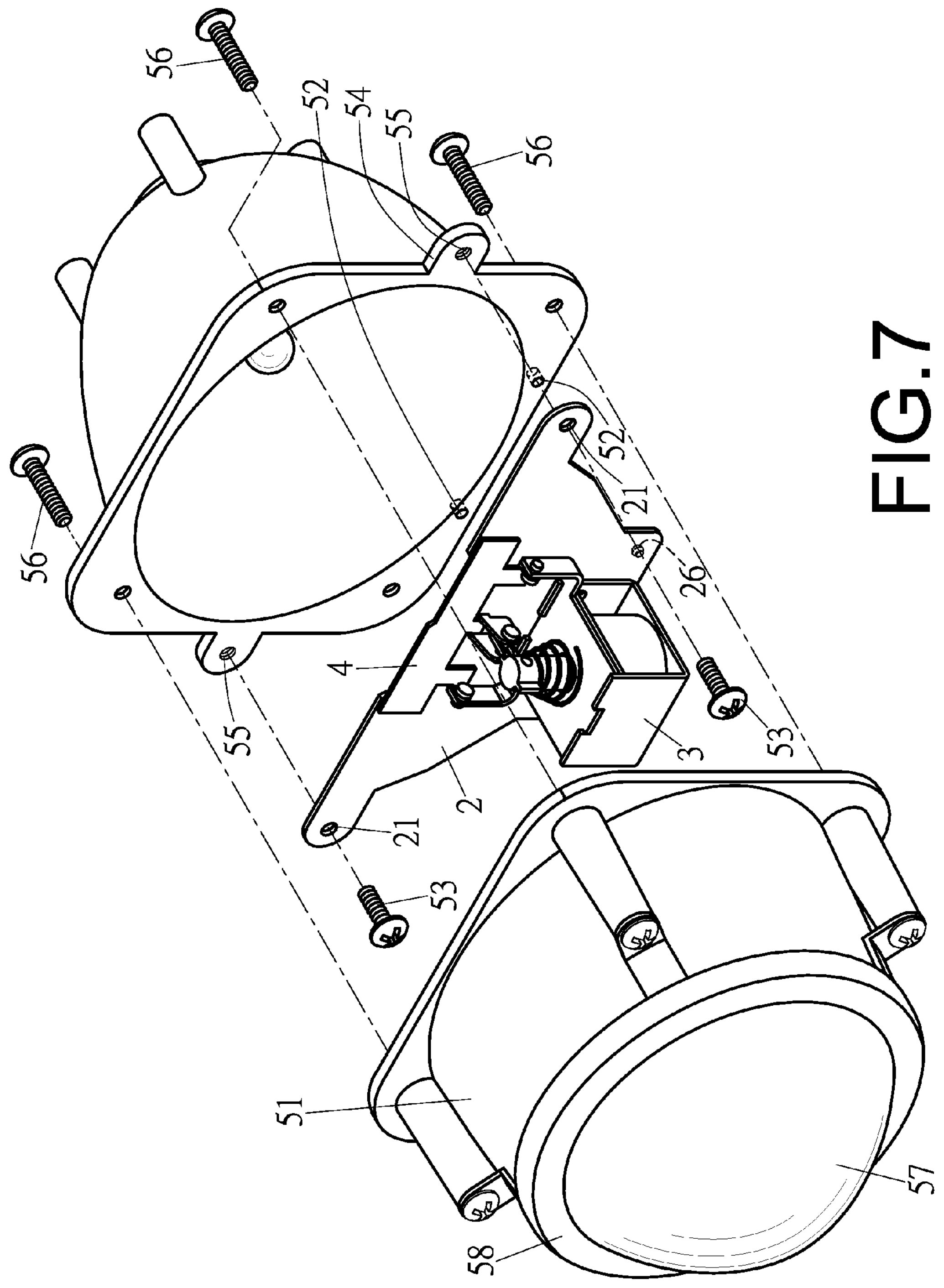
FIG. 7 is an exploded perspective view of the a lamp holder and a transparent lamp shade, illustrating that the controlling device for a headlamp's high and low beam in the present invention is to be assembled inside the lamp holder and the transparent lamp shade.

In assembling, referring to FIGS. 5, 6 and 7, firstly, the spring 39 is fitted around the valve rod 36 and then the valve rod 36 is inserted in the through hole 31 of the valve seat 3, letting the lower end of the valve rod 36 positioned in the center of the electromagnetic valve 30 so as to enable the valve rod 36 to elastically move upward or downward on the valve seat 3. Next, the light-obstructing plate 4 is assembled on the valve seat 3, letting the connecting plate 37 of the valve rod 36 positioned between the opposite two pivotal plates 40 at the lower intermediate portion of the light-obstructing plate 4, and then the pivot 42 is inserted in both the pivotal holes 41 of the two pivotal plates 40 and the slide groove 38 of the connecting plate 37 for pivotally fixing the light-obstructing plate 4 on the connecting plate 37 of the valve rod 36. Subsequently, the opposite two pivotal members 43 at the lower outer ends of the light-obstructing plate 4 are respectively made to rest closely against the inner sides of the two bent-up pivotal plates 34 of the valve seat 3, and then have another two pivots 45 are respectively made to insert in the mutually aligned pivotal holes 35 and 44 for pivotally assembling the light-obstructing plate 4 on the valve seat 3. Afterward, have the valve seat 3 closely leaning on one side of the fixing plate 2, letting the positioning projections 33 at one side wall of the valve seat 3 respectively engaged in the positioning holes 24 of the fixing plate 2. Then screw members 25 are respectively inserted through the insert holes 23 of the fixing plate 2 and screwed in the threaded holes 32 of the valve seat 3 to secure the valve seat 3 at one side of the fixing plate 2, letting the light-obstructing plate 4, which is pivotally mounted on the valve seat 3, cover the notch 22 of the fixing plate 2 and thus finishing assembly of the controlling device for a headlamp's high and low beam.

Figure 8:
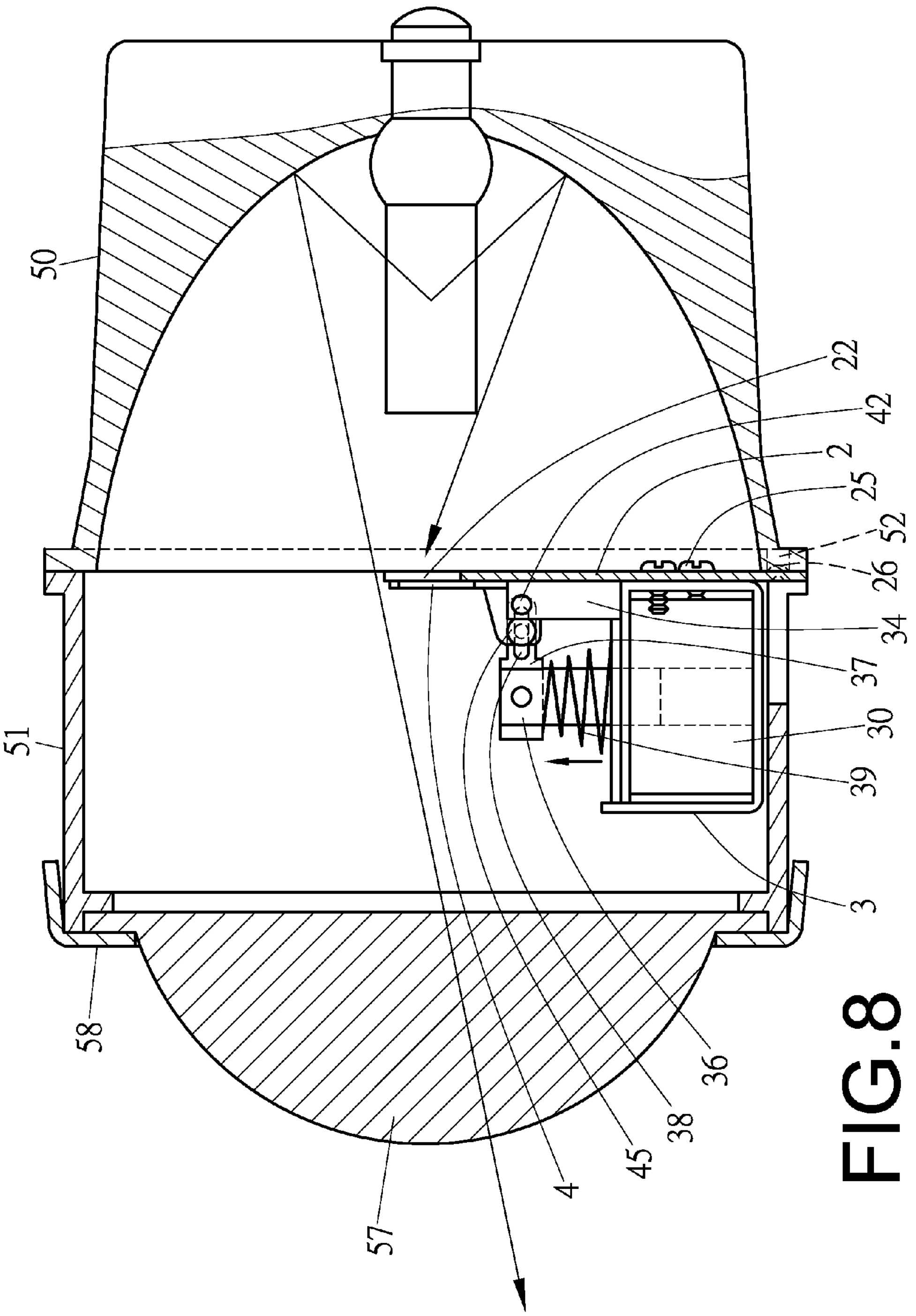
FIG. 8 is a cross-sectional view of the device having the headlamp changed into a low-beam condition in the present invention.

Lastly, the controlling device for a headlamp's high and low beam is assembled between a lamp holder 50 and a transparent lamp shade base 51, as shown in FIGS. 7 and 8, with the positioning projections 26 of the fixing plate 2 respectively engaged and positioned in the positioning engage holes 52 of the lamp holder 50. Then screw members 53 are respectively inserted through the positioning holes 21 of the fixing plate 2 and screwed in the threaded holes 55 of the fixing lugs 54 of the lamp holder 50 to secure the fixing plate 2 on the lamp holder 50.

Then, the transparent light shade base 51 is threadably assembled on the lamp holder 50 by screw members 56, while the transparent light shade 57 is fixed on the transparent light shade base by means of a fixing frame 58. By so designing, the controlling device for a headlamp's high and low beam of this invention can effectively carry out change-over of high and low beam of a headlamp, simple in components, quick in assembly and low in manufacturing cost.

Figure 9:
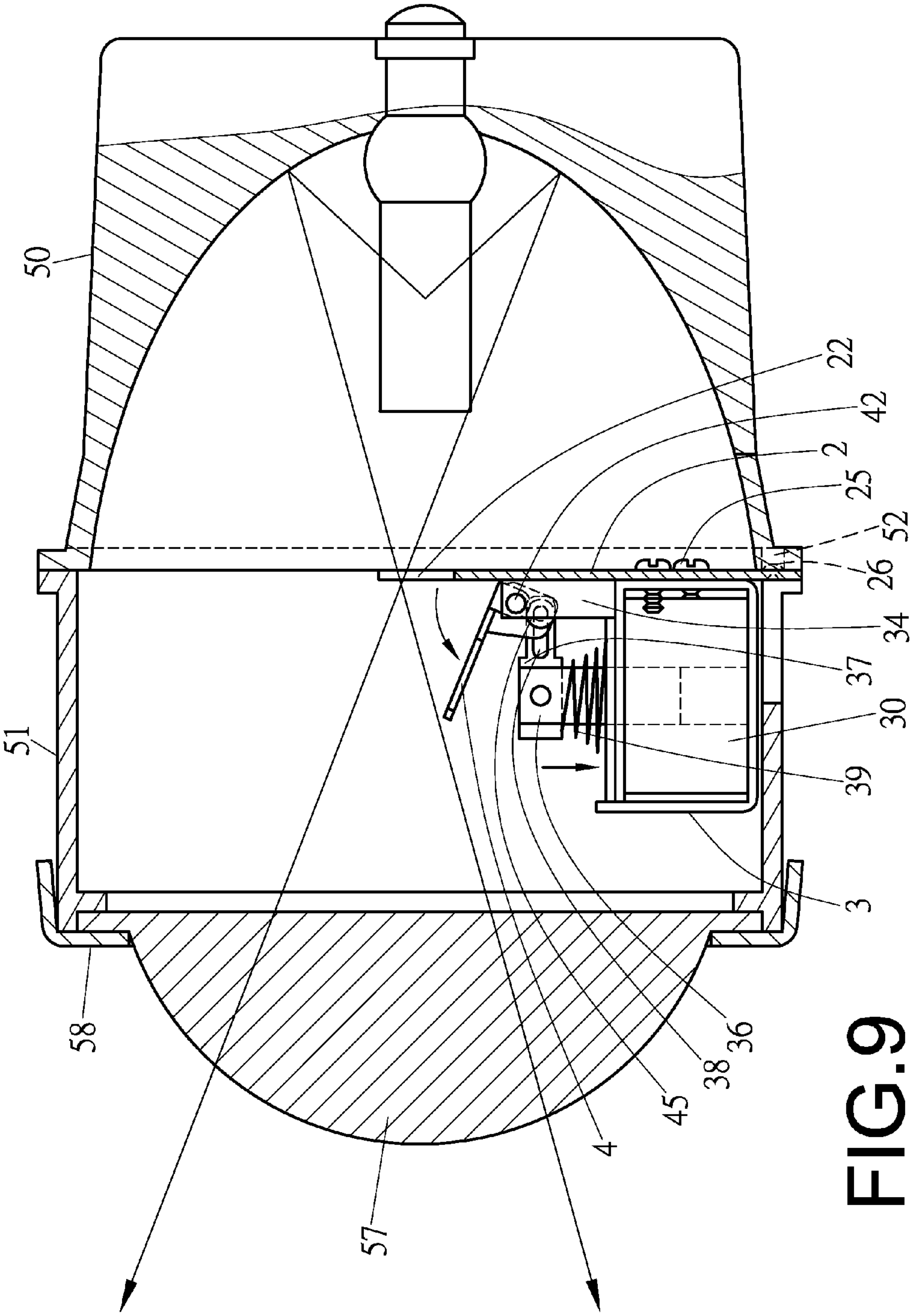
FIG. 9 is a cross-sectional view of the device having the headlamp changed into a high-beam condition in the present invention.

In operating and using, referring to FIGS. 8 and 9, when electrically connected, the electromagnetic valve will produce magnetic force to attract the valve rod 36 together with the connecting plate 37 to move downward and with the spring 39 compressed. Meanwhile, the pivot 42 inserted in the slide groove 38 of the connecting plate 37 will be actuated by the connecting plate 37 to shift down and slide in the slide groove 38. At this time, the light-obstructing plate 4, which is pivotally assembled with the connecting plate 37 and has the pivots 45 at two outer ends of the pivotal plates 34 of the valve seat 3 serving as fulcrums, is actuated by the pivot 42 to turn and shift downward not to cover the notch 22 of the fixing plate 2 any longer, thus enabling refracted light of the headlamp to be projected out completely and converting the headlamp into high beam. On the contrary, to change the headlamp into low beam, the electromagnetic valve 30 is electrically disconnected to let the spring 39 recover elastic force to push the connecting plate 37 and the valve rod 36 upward and actuate the light-obstructing plate 4 to turn and shift upward and recover its original position to cover again the notch 22 of the fixing plate 2 anew to form a comparatively small light projecting range.

Apparently, the controlling device for a headlamp's high and low beam in the present invention is different from the conventional device in structure, able to simplify components, elevate assembly efficiency and lower cost.

While the preferred embodiment of the invention has been described above, it will be recognized and understood that various modifications may be made therein and the appended claims are intended to cover all such modifications that may fall with the spirit and scope of the invention.

What is claimed is:

1. A controlling device for a headlamp's high and low beam comprising:

a fixing plate having opposite ends respectively formed with a positioning member, said positioning members respectively bored with a positioning hole, said fixing plate having an upper edge disposed with a notch;

a valve seat secured at one side of said fixing plate, said valve seat installed with an electromagnetic valve in an interior, said valve seat having a topside bored with a through hole communicating with a center of said electromagnetic valve, a valve rod inserted through said through hole of said valve seat and in the center of said electromagnetic valve, a spring fitted around said valve rod;

a light-obstructing plate actuated to cover said notch of said fixing plate; and, characterized by said valve seat having two sides of a topside respectively and oppositely provided with a pivotal member bent upward and bored with a pivotal hole, said valve rod having an upper side assembled with a connecting plate with a slide groove, said light-obstructing plate pivotally combined with both said pivotal plate of said valve seat and said connecting plate of said valve rod, said light-obstructing plate oppositely provided with two protruding pivotal plates at a lower central location and each said pivotal plate having a pivotal hole, a pivot inserted in both said pivotal holes of said pivotal plates and said slide groove of said connecting plate, said light-obstructing plate further having lower opposite ends respectively and oppositely formed with a pivotal member with a pivotal hole, another pivot inserted in both said pivotal hole of said pivotal member and said pivotal hole of said pivotal plate of said valve seat.

2. A device for controlling a headlamp's high and low beam as claimed in claim 1, wherein said fixing plate is bored with a plurality of insert holes and positioning engage holes, and said valve seat has one side wall bored with threaded holes at locations corresponding with said insert holes of said fixing plate and provided with positioning projections at locations corresponding with positioning engage holes of said fixing plate, plural screw members respectively inserted through said insert holes of said fixing plate and screwed with said threaded holes of said valve seat to secure said valve seat at one side of said fixing plate.

* * * * *